Figure 6:
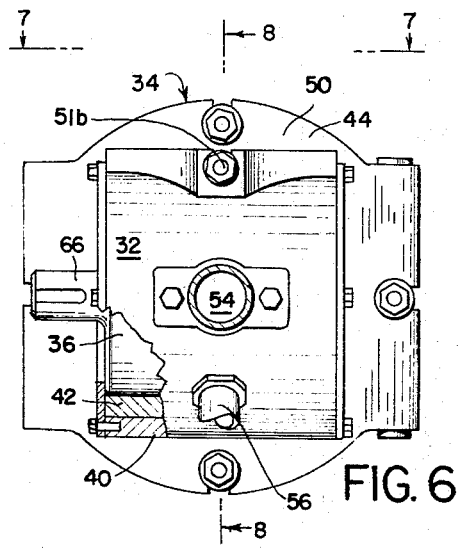

Nov. 29, 1966     H. V. PERTTULA     3,288,053
FEED VALVE
Filed May 31, 1963     2 Sheets-Sheet 1
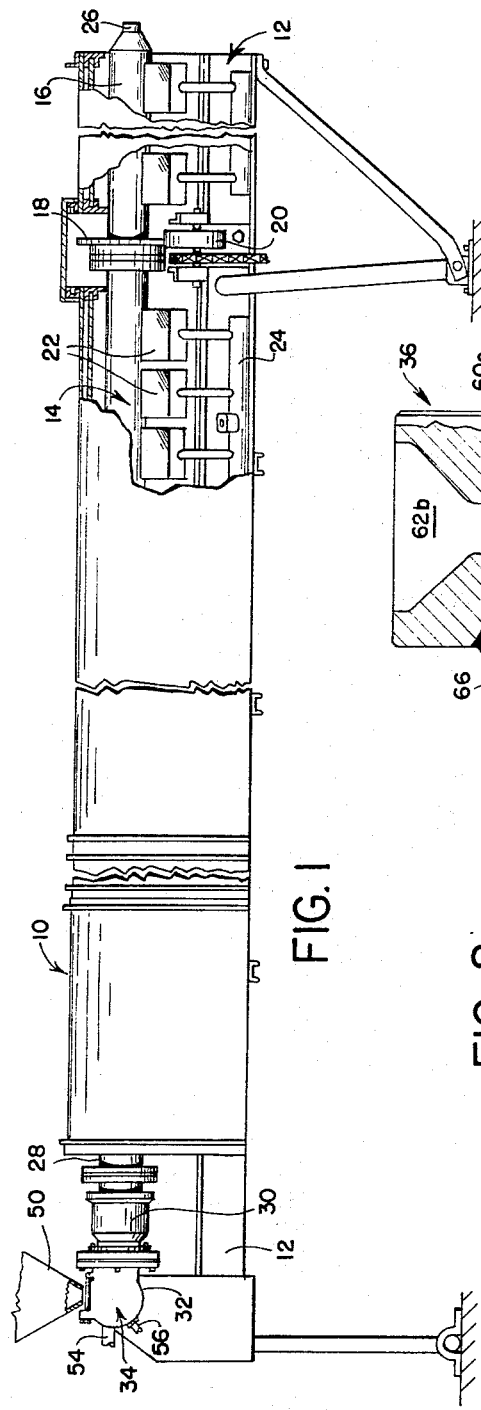
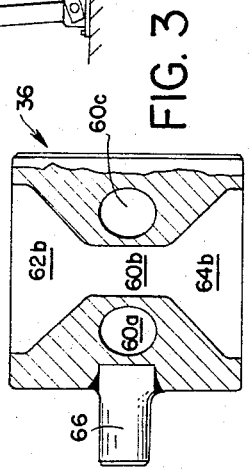
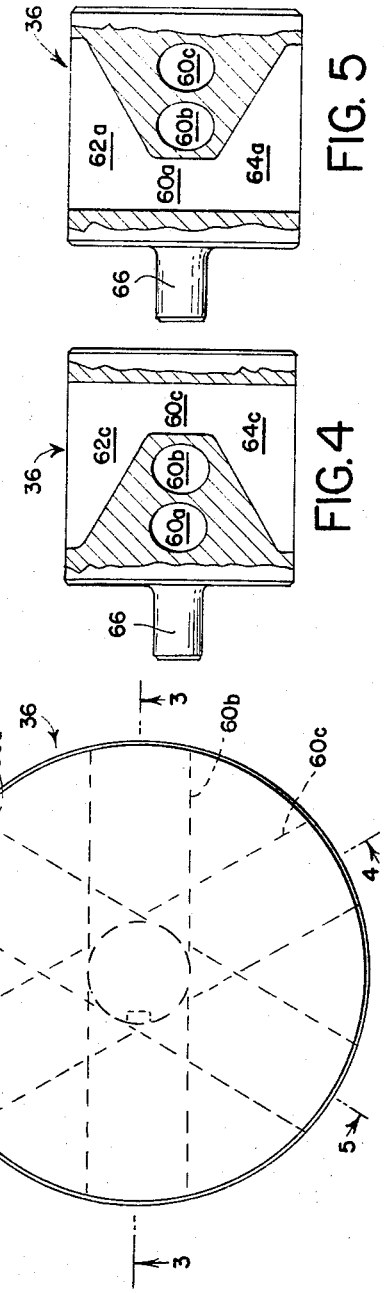
INVENTOR.
HAROLD V. PERTTULA
BY Robert B. Hughes
ATTORNEY Nov. 29, 1966  H. V. PERTTULA  3,288,053
FEED VALVE
Filed May 31, 1963  2 Sheets-Sheet 2

INVENTOR.
HAROLD V. PERTTULA
BY Robert B. Hughes
ATTORNEY

United States Patent Office 3,288,053
Patented Nov. 29, 1966

3,288,053
FEED VALVE
Harold V. Perttula, Minneapolis, Minn., assignor to General Mills, Inc., a corporation of Delaware
Filed May 31, 1963, Ser. No. 284,470
10 Claims. (Cl. 99—238)

This invention relates generally to a pressure seal feed valve, and more particularly to such a valve adapted to feed a material such as dough pellets and a pressurized processing fluid into a continuous puffing gun.

In the food processing field, apparatus has been devised for the continuous cooking and puffing of pre-formed cereal dough bodies or pellets, in which there is an elongated rotating barrel forming a processing chamber for the food pellets which are introduced into the inlet end of the barrel at a predetermined rate. Steam is continuously fed into the chamber at the inlet end to serve as a processing fluid for the pellets. Movement of the pellets through the barrel to the discharge end thereof is accomplished partly by the turbulent action of this steam passing through the chamber and partly by moderately inclining the barrel downwardly toward the discharge end so that the rotation of the barrel about its axis tumbles the contained pellets gradually toward the outlet. To cook the pellets, suitable heaters are provided along the length of the barrel. The desired puffing or expansion of the food pellets is achieved by moving the pellets rather abruptly from within the chamber, where the pressure is perhaps as high as 100 pounds per square inch or possibly more, through a nozzle at the discharge end of the gun to the outside atmosphere or to a suitable large container where the pressure is nearly atmospheric and the temperature is appreciably lower than that within the chamber. This rush of steam at the discharge end of barrel carries the food pellets through the nozzle and shoots them out in a substantially continuous stream.

The most common method of feeding dough pellets into the processing chamber of this puffing gun utilizes a conventional star valve, which comprises a rotor mounted in a valve block which has an inlet and outlet port. The peripheral portion of the rotor is formed with a plurality of pockets, each of which as the rotor turns, communicates first with the inlet port to receive a charge of dough pellets (as from a surmounting hopper), and then with the outlet port to discharge the pellets into a housing at the inlet end of the puffing gun, with the rotor thus continuously forming a seal with its block. Steam is introduced into the housing through separate inlet means in a manner to move the pellets discharged by the star valve from the housing into the processing chamber formed by the rotating gun barrel. Since the dough pellets will sometimes stick in the rotor pockets, it is sometimes necessary to direct some of this steam or an air blast into these pockets so as to insure complete scavenging of the pockets.

It is an object of the present invention to provide in an apparatus such as a continuous puffing gun an improved and simple feed valve mechanism, which provides an effective pressure seal, and which properly and efficiently accomplishes the introduction of both a material such as dough pellets from a low pressure source and a high pressure fluid such as pressurized steam into a chamber such as the processing chamber of a puffing gun, and yet prevents sticking or clogging the material in the valve mechanism by arranging the entry of the steam so that there is an inherent scavenging action as it passes through the valve.

Figure 7:
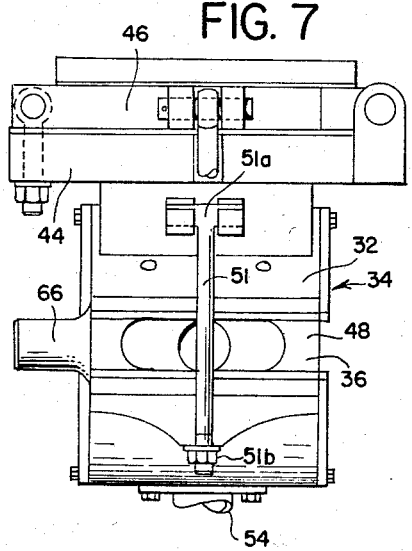
Figure 8:
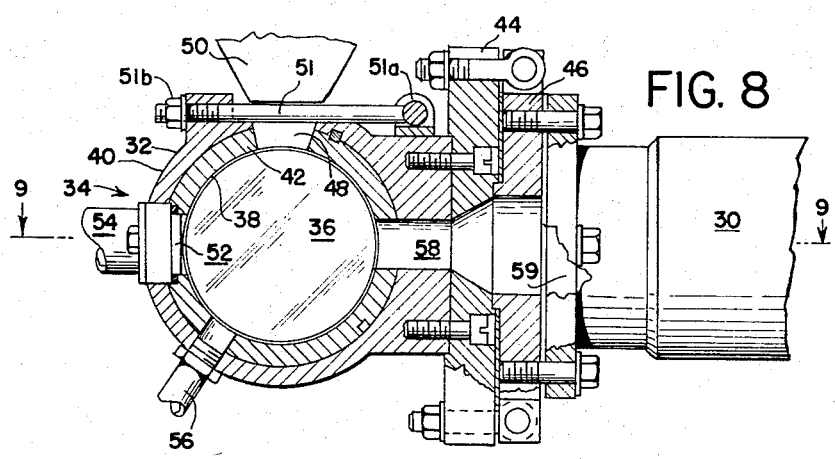
Figure 9:
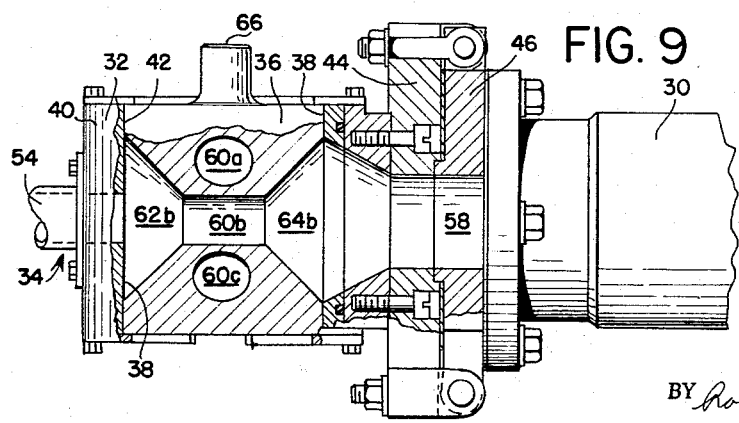

These and other objects and features of the invention will be more readily understood and appreciated from the following detailed description of the preferred embodiment thereof selected for purposes of illustration and shown in the accompanying drawings, in which:

FIGURE 1 is a fragmentary side elevational view of a puffing gun having a feed valve embodying preferred teachings of the present invention, FIGURE 2 is an end view of the rotor of said feed valve, FIGURE 3 is a sectional view taken on line 3—3 of FIG. 2, FIGURE 4 is a sectional view taken on line 4—4 of FIG. 2, FIGURE 5 is a sectional view taken on line 5—5 of FIG. 2, FIGURE 6 is a rear end view of said valve, FIGURE 7 is a top plan view thereof, taken on line 7—7 of FIG. 6, FIGURE 8 is a sectional view taken on line 8—8 of FIG. 6, and FIGURE 9 is a horizontal sectional view taken generally on line 9—9 of FIG. 8.

Shown in FIG. 1 is a continuous puffing gun, designated generally 10, and comprising a suitable frame 12 on which a relatively long cylindrical puffing gun barrel 14 is mounted for rotation on its longitudinal axis. The barrel 14 carries at its outlet end 16 a circular driving flange 18 which rests on driving rollers 20 by means of which the barrel is rotated on its longitudinal axis at a desired operating speed. The rotating barrel 14 is heated by one or more burner units 22 which are shown as gas burner connected to a suitable gas manifold 24.

The longitudinal axis of the barrel 14 is slanted downwardly toward the outlet end 16 so that the rotation of the barrel about its axis will tumble the contained food pellets gradually toward the outlet end 16 of the barrel 14. At this outlet end 16 is a nozzle 26, through which processed food pellets and steam are discharged in a substantially continuous stream. The inlet end 28 of the gun barrel 14 is connected to, and rotatably supported by, a rotary bearing end joint 30 secured to a fixed housing 32 of a feed valve 34 which serves to feed steam and dough pellets into the processing gun 10.

It is this feed valve 34 to which the subject matter of the present invention is particularly directed. This valve 34 comprises generally the afore-mentioned housing 32 and a rotor 36 mounted in a cylindrical bore 38 defined by the housing 32, for rotation about a transverse horizontal axis. The housing 32 itself comprises an outer casing 40 and an inner liner 42 which defines the aforementioned bore 38. Screwed to the front end of the casing 40 is a connecting flange 44, which in turn connects to a flange 46 secured to the rotary bearing 30, thus providing a convenient means of mounting the feed valve 34 at the rear of the bearing 30.

The housing 32 (i.e., both the casing 40 and liner 42) is formed with four radial ports communicating with the bore cavity 38, and disposed generally in the same plane extending perpendicular to the axis of the bore 38 at about the mid-length thereof. The first port 48 is located at the top of the housing 32 and opens to a suitable hopper or other feed device 50 located thereabove. This port 48 is conveniently formed as a slot cutting completely across the housing 32. A bolt 51 is connected by its head portion 51a to the upper forward part of the housing 32 and extends across the port 48 to connect by means of its related bolt 51b to the upper rear part of the housing 32. By tightening the nut 51b, the proper centripedal pressure can be exerted by the housing 32 on the rotor 36 to insure a proper pressure seal therebetween.

The second port 52 is at the rear of the housing 32 and communicates with a source of pressurized steam, as through a hose 54. Moderately below the port 52

(i.e. as seen in FIG. 8, about 45 degrees counterclockwise of the port 52 with respect to the axis of the bore 38) is a relief port 56, the function of which will be described more fully hereinafter. Located at the front of the housing 32 so as to be diametrically opposed to, and level with, the steam inlet port 52 is a discharge port 58 leading through a passage 59 in the rotary bearing 30 into the processing chamber of the barrel 14.

The rotor 36 is a generally solid cylindrical member formed wth a plurality (3 herein) of separate through passages designated 60a, b, and c, respectively, which pass through the longitudinal center axis of the rotor 36, at, respectively, the left, middle, and right hand portions thereof (as seen in FIGS. 3 to 5). Each two related mouth portions 62a and 64a, 62b and 64b, and 62c and 64c of, respectively, the passages 60a, b, and c are diametrically opposed to each other with respect to the rotational axis of the rotor 36; and each broadens moderately with respect to the longitudinal axis of the rotor 36 so that the six mouth openings 62 and 64, a, b, and c, lie in generally the same plane perpendicular to, and at the middle-length of, the longitudinal axis of the rotor 36, so as to be aligned with the ports 48, 52, 56 and 58. With reference to planes containing both the longitudinal axis of the rotor 36 and the longitudinal axis of a respective passage 60a, b, or c, each of these passages 60a, b, and c are disposed at sixty degree angles with the other two. Thus as the rotor 36 turns within the bore 38, in every sixty degree increment of rotation, one of the mouth openings 62 or 64a, b or c, will pass in sequence by any designated port, either 48, 52, 56 or 58. The rotor 36 is provided with an axially aligned socket member 66 to connect to a suitable drive shaft (not shown) driven from a power source to turn the rotor 36.

In operation, dough pellets to be processed are fed into the top port 48 from the hopper 50, while steam is fed through the hose 54 to the port 52, and the rotor 36 (as seen in FIG. 8) is turned counterclockwise. When one of the passages (e.g. 60a) is vertically disposed, one mouth opening thereof (e.g. 62a) is in communication with the top port 48, and a charge of food pellets fall into this passage 60a. When the rotor 36 has turned sixty degrees, a second passage 60b will be vertically disposed and will receive a charge of dough pellets, and will thereafter follow the same operating cycle hereinafter described for passage 60a. After a total of ninety degrees of rotation, the passage 60a will be horizontally disposed and thus be in registration with both the steam feed port 52 and the discharge port 58, with the result that a rush of steam moves through the passage 60a moving the charge of dough pellets therein through the discharge port 58 and rotary bearing passage 59 and into the processing chamber of the barrel 14.

After a further forty-five degrees of rotation from its horizontal position, the passage 60a comes into communication with the relief port 56 to bring the pressure within the passage 60a to atmospheric. The rotor, after another forty-five degrees of rotation (now ninety degrees past horizontal), has its other mouth opening 64a in registration with the top port 48 so that the passage 60a, after a total of 180 degrees of rotation, now receives a second charge of dough pellets. However, as the passage 64a now goes through a further ninety degrees of rotation, the passage 60a has rotated 180 degrees from its previous discharge position, and the food pellets are thus discharged from the passage 60a in the opposite direction (with respect to the rotor 36 only) from that in which they were just previously discharged, although with respect to the whole processing gun 10, the discharge direction is always forward.

Thus, on every sixty degrees of rotation of the rotor 36, a charge of food pellets is fed into one of the passages 60a, b, or c, to be discharged through the outlet port 58 into the barrel 14, after being carried for a quarter turn by the rotor 36. Also since for each passage 60a, b, or c, the discharge path on each half turn of the rotor 36 is in opposite directions therethrough (with respect to the rotor 36), the proper intake and discharge operation of the valve 34 is faciiltated.

What is claimed is:

1. In a mechanism having a pressurized processing chamber, into which material to be processed is fed from a first supply means and a pressurized processing fluid is fed from a second supply means, an improved feed valve comprising: first and second valve members relatively movable with respect to each other from first to second to third operating positions; said first member having first port inlet means connecting to said first supply means, second port inlet means connecting to said second supply means, port outlet means connecting to said processing chamber, and pressure relief port means; said second member having at least one valve passage therethrough having first and second openings; said port inlet and outlet means, said relief port means and said valve passage openings being constructed and located in said members such that in said first operating position said first valve passage opening is in registration with said first port inlet means and said second valve passage opening is closed by said first member, and in said second operating position one of said valve passage openings is in registration with said second port inlet means and the other valve passage opening is in registration with said port outlet means, and in said third operating position one of said valve passage openings is in registration with said relief port means.

2. The combination as recited in claim 1, wherein said second valve member is rotatably mounted with respect to said first member, and there are a plurality of said passages in said second member which move sequentially through said operating positions with respect to said first member.

3. A feed valve according to claim 1 in which the second valve member is rotatably movable with respect to said first valve member in a direction such that in said first, second and third operating positions said first valve passage opening is successively located in registration with said first port inlet means, said second port inlet means and said pressure relief port means, respectively.

4. A feed valve according to claim 3 in which said second valve member is further rotatably movable from said third operating position to three successive additional operating positions generally corresponding to said first, second and third operating positions but in which said second valve pasage opening is successively located in registration with said first port inlet means, said second port inlet means and said pressure relief port means, respectively.

5. In combination, a mechanism having a pressurized processing chamber with an inlet portion and an outlet portion, first means to supply material from a low pressure source to said machine, second means to supply a pressurized fluid to said machine, a valve mechanism to receive said material and said fluid from said two supply means and direct said fluid and material into said chamber, said valve comprising: a first and second member movable with respect to one another; said first member having first port inlet means connecting to said first supply means, second port inlet means connecting to said second supply means, and port outlet means leading to the inlet portion of said processing chamber; said second member having at least one through passage having two openings and having a first and second operating position, said second member being such that in said first operating position one of said openings is in registration with said first port inlet means and the other opening is closed by said first member, and in said second operating position one opening is in registration with said second port inlet means and the other opening is in registration with said port outlet means, said second member being movable in a cyclic motion alternating between said first and second positions so that said passage is charged with material in its first position and in its second position pressurized fluid moves through said passage to carry said material into said processing chamber, said first member also having port relief means which comes into registration with one of said openings when said second member has moved from its second position, but before it has reached its first position.

6. In combination, a mechanism having a pressurized processing chamber with an inlet portion and an outlet portion, first means to supply material from a low pressure source to said machine, second means to supply a presurized fluid to said machine, a valve mechanism to receive said material and said fluid from said two supply means and direct said fluid and material into said chamber, said valve comprising: a first and second member movable with respect to one another; said first member having first port inlet means connecting to said first supply means, second port inlet means connecting to said second supply means, and port outlet means leading to the inlet portion of said processing chamber; said second member having at least one through passage having two openings and having a first and second operating position, said second member being such that in said first operating position one of said openings is in registration with said first port inlet means and the other opening is closed by said first member, and in said second operating position, one opening is in registration with said second port inlet means and the other opening is in registration with said port outlet means, said second member being movable in a cyclic motion alternating between said first and second positions so that said passage is charged with material in its first position and in its second position pressurized fluid moves through said passage to carry said material into said processing chamber, said second member being rotatably mounted with respect to said first member, and said first member having port relief means which comes into registration with one of said opening means when said second member is moving from its second to its first position.

7. The combination as recited in claim 6, wherein there are a plurality of said passages, each of which has a pair of related openings each opening being diametrically opposed to its related opening, so that on each cycle of rotation of said second member, each passage moves to its second position twice, with fluid and material flowing oppositely in each cycle through each of said passages.

8. In a continuous puffing gun, wherein material to be puffed is fed by first supply means and a processing fluid such as steam is fed by second supply means into a processing chamber of said gun, a feed valve, comprising: first and second members movable with respect to one another; said first member having first port inlet means connecting to said first supply means, second port inlet means connecting to said second supply means, and port outlet means leading to said processing chamber; said second member having at least one through passage having two openings and having a first and second operating position, the construction of said second member being such that in said first operating position one of said openings is in registration with said first port inlet means and the other opening is closed by said first member, and in said second operating position one opening is in registration with said second port inlet means and the other opening is in registration with said port outlet means, said second member being movable in a cyclic motion alternating between said first and second positions so that said passage is charged with material in its first position and in its second position pressurized fluid moves through said passage to carry said material into said processing chamber, said first member also having port relief means which comes into registration with one of said openings when said second member is moving from its second to its first position.

9. The valve as recited in claim 8, wherein there are a plurality of said passages, each of which has a pair of related openings each opening being diametrically opposed to its related opening, so that on each cycle of rotation of said second member each passage moves to its second position twice with fluid and material flowing oppositely in each cycle through each of said passages.

10. The valve as recited in claim 9, wherein said first member is an outer casing having a cylindrical bore and said second member is a cylindrical rotor mounted in said bore, said passages each extending generally diametrically through said rotor at different locations along the axis thereof, the openings of said passages all being located generally in a plane which is perpendicular to the longitudinal axis of said cylindrical rotor, said port means also being located in said plane, said second port inlet means being diametrically opposed to said port outlet means, said first port inlet means being located on one side of a bore diameter defined by said second port means and said port outlet means, and said port relief means being located on the other side of said diameter and displaced from a location diametrically opposed to said first port inlet means.

References Cited by the Examiner

UNITED STATES PATENTS

| | | | |
|---|---|---|---|
| 2,054,093 | 9/1936 | Mills | 99—251 |
| 2,863,375 | 12/1958 | Long et al. | 99—238 |
| 2,914,223 | 11/1959 | Richter | 222—194 |
| 3,018,715 | 1/1962 | McCleary et al. | 99—238 |

WALTER A. SCHEEL, *Primary Examiner.*

R. W. JENKINS, *Assistant Examiner.*